Patented May 25, 1937

2,081,770

UNITED STATES PATENT OFFICE 2,081,770

PRODUCING ACETALDEHYDE FROM ACETYLENE

Walter Rosinsky, Oppau, Germany, assignor to I. G. Farbenindustrie Aktiengesellschaft, Frankfort-on-the-Main, Germany No Drawing. Application August 29, 1934, Serial No. 742,005. In Germany September 7, 1933

5 Claims. (Cl. 260—139)

The present invention relates to a process for producing acetaldehyde from acetylene.

It has already been proposed to carry out the catalytic hydration of acetylene to acetaldehyde in the gaseous phase, as for example according to the U. S. Patent No. 1,856,639 or 1,926,575.

In the British Patent No. 313,864 a process for the manufacture and production of acetaldehyde from acetylene is described according to which concentrated aqueous solutions of neutral salts, the concentrated aqueous solutions of which are known to have an acid reaction, are allowed to act on acetylene or on gases containing the same, preferably at elevated temperatures. In the U. S. application Ser. No. 637,544 a process for the catalytic hydration of acetylene to acetaldehyde is described according to which a gaseous mixture comprising acetylene is led, while warming, preferably to from about 80° to about 250° C., through a concentrated aqueous solution of an ansolvo acid, that is a solution containing at least one water-soluble neutral salt, especially a halide, of a solid base heavy metal capable of behaving like an acid, the reaction being carried out at a pressure above atmospheric pressure in the range which avoids explosions and in the presence of an additional quantity of water sufficient to reduce the boiling point of the said solution, at atmospheric pressure, below that of a corresponding saturated solution but so small that the said solution still has an acid reaction to methyl orange, i. e. that the heavy metal salt remains in the form of an ansolvo acid.

I have now found that it is especially advantageous so to combine the said processes that acetylene or gas mixture containing acetylene are first led through one of the said aqueous solutions, the residual gas which still contains acetylene then being subjected to catalytic hydration in the gaseous phase, if desired after the removal of the acetaldehyde formed. This new manner of working embraces the advantages of all the said processes and thus renders possible a high throughput with the greatest safety in operation.

The special advantage of working with the said solutions of ansolvo acids consists in the fact that they have an extremely good and lasting activity even when employing impure gas mixtures and may be readily regenerated in a simple manner, as for example merely by leading them over neutral adsorption agents, when the activity subsides. In order to obtain the greatest possible conversion by a single passage of the acetylene through the catalytic liquid according to this process a fine dispersion of the gas in the catalytic liquid is necessary whereby the total throughput per hour is injuriously affected. The hydration in the gaseous phase, on the contrary, offers the advantage of a high speed of throughput, but in this case the employment of very pure gases is necessary for maintaining the activity of the catalyst and the strongly exothermic character of the reaction in the gaseous phase necessitates the employment of dilute gases.

The combination of the two processes according to the present invention offers the further valuable advantages:

By reason of the fact that it is not necessary to aim at a complete conversion of acetylene in the first stage of this process, a high total throughput may be employed. In consequence thereof the acetylene is not completely converted into acetaldehyde in the first stage of the process, but contrary to expectation the impurities present in the gas, as for example vinyl acetylene and diacetylene when the acetylene has been prepared electro-thermally, are practically completely retained by the said solutions without the activity of the latter suffering; moreover any necessary regeneration of these solutions may be carried out without difficulty. There is thus obtained from the first reaction vessel a strongly diluted but very pure gas mixture which, preferably after removal of the acetaldehyde already formed which, similarly to the conversion, may be carried out under increased pressure, is then led in a second stage together with water vapor over a solid catalyst. By reason of the high purity of the gas mixture and its greatly reduced acetylene content, the conversion in this second stage, which may also be carried out under pressure if desired, proceeds with great certainty and without reduction in the activity of the catalyst. The reduction of the acetylene content of the gas mixture is thus effected without the admixture of inert gases which would otherwise be necessary by reason of the strongly exothermic character of the conversion in the gaseous phase.

In addition to the said advantages of an increased throughput and the great safety in operation it is of practical importance that the acetaldehyde obtained is very pure. As is well known, the formation of crotonaldehyde as a by-product in the hydration of acetylene is promoted with increasing temperature. Since the temperature in the first stage according to this invention may be kept low and especially since local overheating is avoided in the second stage by reason of the strong dilution of the gas mixture, the possibility of the formation of crotonaldehyde is restricted.

As solutions of neutral salts the solutions of which have an acid reaction may be mentioned highly concentrated solutions of salts of zinc, cadmium and chromium. If the activity of the solutions should subside after use for a long time by reason of accumulation or of precipitation of polymerization products, which are formed when working up industrial gas mixtures as for example gases containing acetylene obtained from methane or natural gases by electric arc processes, a simple filtration through bleaching earths or active carbon suffices to regenerate them. It is of advantage to carry out this regeneration continuously by continuously withdrawing a portion of the catalytic liquid, filtering it and returning it to the reaction vessel.

As catalysts for the conversion of the acetylene contained in the residual gases in the gaseous phase, mixtures of difficultly reducible oxides containing a preponderance of basic constituents, as for example mixtures of aluminium oxide with tungstic acid and small amounts of zinc oxide (see for example the said U. S. Patent Nos. 1,856,639 and 1,926,575) are especially suitable.

The following example will further illustrate how the present invention may be carried out in practice; the invention is not restricted to this example.

*Example*

A gas mixture formed by leading methane or natural gas through an electric arc and freed from the major portion of the diacetylene contained in the mixture by washing with gas oil and which after such purification has the following composition:

|  | Per cent |
|---|---|
| Acetylene | 15 |
| Hydrogen | 70 |
| Methane and its homologues | 14 |
| Various unsaturated hydrocarbons | 1 | is led with the velocity of 2000 liters per hour at 140° C. through a solution, having an acid reaction, of 13.6 kilograms of zinc chloride in 6.3 kilograms of water, the water consumed in the process being replaced. The acetaldehyde formed in this first stage is separated by washing with water under atmospheric pressure. The residual gas having the composition:

|  | Per cent |
|---|---|
| Acetylene | 5 |
| Hydrogen | 78 |
| Methane and its homologues | 17 |
| Unsaturated hydrocarbons | 0 | is saturated with water vapor at 85° C. and then led at from about 300° to about 400° C. over a catalyst formed from the oxides of aluminium, tungsten and zinc in the ratio of 81:14:5. The remainder of the acetylene is thus converted into acetaldehyde which is separated from the residual gas by washing with water.

What I claim is:

1. A process for producing acetaldehyde by catalytic hydration of acetylene which comprises rapidly passing an impure gas mixture comprising acetylene, while warming, through an ansolvo acid solution thereby substantially removing the impurities from such gas mixture and converting part of the acetylene into acetaldehyde and then subjecting the residual purified gas to catalytic hydration in the gaseous phase.

2. A process for producing acetaldehyde by catalytic hydration of acetylene which comprises rapidly passing an impure gas mixture comprising acetylene, while warming, through an ansolvo acid solution thereby substantially removing the impurities from such gas mixture and converting part of the acetylene into acetaldehyde, removing the acetaldehyde formed and then subjecting the residual purified gas to catalytic hydration in the gaseous phase.

3. A process for producing acetaldehyde by catalytic hydration of acetylene which comprises leading a gas mixture free from oxygen and containing acetylene, while warming, through an ansolvo acid solution thereby substantially removing the impurities from such gas mixture and converting part of the acetylene into acetaldehyde and then subjecting the residual purified gas to catalytic hydration in the gaseous phase.

4. A process for producing acetaldehyde by catalytic hydration of acetylene which comprises rapidly passing an impure gas mixture comprising acetylene, while warming, through a solution of one molecular proportion of zinc chloride in 3.5 molecular proportions of water thereby substantially removing the impurities from such gas mixture and converting part of the acetylene into acetaldehyde and then subjecting the residual purified gas to catalytic hydration in the gaseous phase.

5. A process for producing acetaldehyde by catalytic hydration of acetylene which comprises rapidly passing an impure gas mixture comprising acetylene, while warming, through an ansolvo acid solution thereby substantially removing the impurities from such gas mixture and converting part of the acetylene into acetaldehyde and then subjecting the residual purified gas to catalytic hydration in the gaseous phase at between about 300° and about 400° C.

WALTER ROSINSKY.